(12) United States Patent
Manmohan et al.

(10) Patent No.: US 8,447,826 B1
(45) Date of Patent: May 21, 2013

(54) METHOD AND APPARATUS FOR PROVIDING HIGHLY AVAILABLE STORAGE GROUPS

(75) Inventors: Sarin Sumit Manmohan, Pune (IN); Manish Kumar, Pune (IN)

(73) Assignee: Symantec Corporation, Mountain View, CA (US)

( * ) Notice: Subject to any disclaimer, the term of this patent is extended or adjusted under 35 U.S.C. 154(b) by 387 days.

(21) Appl. No.: 12/559,410

(22) Filed: Sep. 14, 2009

(51) Int. Cl.
*G06F 15/167* (2006.01)

(52) U.S. Cl.
USPC ............................ 709/214; 709/206; 709/207

(58) Field of Classification Search .......... 709/203–207, 709/217–219, 214; 718/105
See application file for complete search history.

(56) References Cited

U.S. PATENT DOCUMENTS

| | | | | |
|---|---|---|---|---|
| 5,915,004 | A * | 6/1999 | Pabbati et al. | 379/100.08 |
| 7,117,246 | B2 * | 10/2006 | Christenson et al. | 709/206 |
| 7,711,683 | B1 * | 5/2010 | Watanabe et al. | 711/100 |
| 2002/0112008 | A1 * | 8/2002 | Christenson et al. | 709/206 |
| 2005/0193245 | A1 * | 9/2005 | Hayden et al. | 714/13 |
| 2005/0267938 | A1 * | 12/2005 | Czeczulin | 709/206 |
| 2007/0226304 | A1 * | 9/2007 | Virk et al. | 709/206 |
| 2007/0244996 | A1 * | 10/2007 | Ahmed et al. | 709/220 |
| 2008/0109448 | A1 * | 5/2008 | Aboel-Nil et al. | 707/10 |
| 2009/0144743 | A1 * | 6/2009 | Wolslegel | 718/105 |
| 2010/0011033 | A1 * | 1/2010 | Czeczulin | 707/204 |

OTHER PUBLICATIONS

"Microsoft Exchange Server," Wikipedia®, a registered trademark of the Wikimedia Foundation, Inc. Downloaded from web site http://en.wikipedia.org/wiki/Microsoft_Exchange_Server on Dec. 11, 2009.

* cited by examiner

*Primary Examiner* — Philip B Tran
(74) *Attorney, Agent, or Firm* — Campbell Stephenson LLP

(57) ABSTRACT

A method and apparatus for providing highly available storage groups are described. In one embodiment, a method for using one or more processors to provide highly available storage groups in memory, comprising updating persistent information associated with at least one mapping between a node and at least one mailbox of a plurality of mailboxes, wherein the node owns the plurality of mailboxes and the persistent information identifies another node as a failover target for the at least one mailbox of the plurality of nodes, accessing at least one storage group that comprises the at least one mailbox, modifying the at least one mapping between the at least one mailbox and the node to bind the at least one mailbox to the other node and coupling the at least one mailbox with the other node.

20 Claims, 6 Drawing Sheets

METHOD AND APPARATUS FOR PROVIDING HIGHLY AVAILABLE STORAGE GROUPS

BACKGROUND OF THE INVENTION

1. Field of the Invention

Embodiments of the present invention generally relate to enterprise level storage group management and, more particularly, to a method and apparatus for providing highly available storage groups.

2. Description of the Related Art

Organizations may currently utilize various technologies to process, secure and/or store mission critical data. For example, such organizations may maintain a datacenter that consists of a number of nodes (e.g., computers). Employees utilize these nodes to increase productivity and manage several tasks to the benefit of the organizations. As another example, such organization may also implement an enterprise level email management system through which the employees may communicate documents to each other and/or individuals from other organizations.

Each computer user (e.g., employee) may be associated with a mailbox (e.g., one or more database files) to which outgoing and incoming emails are stored. One or more mailboxes may form a storage group, which may be controlled by a particular node. In order to maintain productivity at optimal levels, system administrators must configure these storage groups to be highly available. Accordingly, a specific mailbox must be migrated to another node efficiently and quickly in order to mitigate the detrimental effects related to system and/or software failures.

Unfortunately, conventional email server applications cannot provide high availability solutions for n-node computer systems (e.g., computer clusters). These email server applications are unable to migrate individual storage groups and/or mailboxes to another node in response to a system failure and/or overloading. Instead, these email server application failover entire email servers (e.g., physical machines and/or virtual machines), which includes each and every associated storage group. As such, they are unable to accommodate the needs of the system administrators.

Therefore, there is a need in the art for a method and apparatus for providing highly available storage groups to an n-node computer cluster.

SUMMARY OF THE INVENTION

Various embodiments of the present disclosure generally include a method and apparatus for providing highly available storage groups. In one embodiment, a method for using one or more processors to provide highly available storage groups in memory, comprising updating persistent information associated with at least one mapping between a node and at least one mailbox of a plurality of mailboxes, wherein the node owns the plurality of mailboxes and the persistent information identifies another node as a failover target for the at least one mailbox of the plurality of nodes, accessing at least one storage group that comprises the at least one mailbox, modifying the at least one mapping between the at least one mailbox and the node to bind the at least one mailbox to the other node and coupling the at least one mailbox with the other node.

In some embodiments, the persistent information may be used to modify the at least one mapping to indicate that the other node owns the at least one mailbox. In some embodiments, one or more modifications to the at least one mapping may be replicated at a disaster recovery node. In some embodiments, at least one attribute associated with the at least one mailbox may be modified to map the at least one mailbox with the other node.

In some embodiments, the other node may be selected to be a target node for failing over a storage group of the at least one storage group. In some embodiments, the at least one storage group may be failed over from the node to one or more nodes based on a load-balancing policy. In some embodiments, a rollback process may be performed on the at least one mailbox after a failure at the other node, wherein the at least one mailbox is point-in-time consistent. In some embodiments, at least one user may be migrated back to the node from the other node, wherein the at least one user is associated with the at least one mailbox. In some embodiments, the persistent information and at least one mailbox database file are transformed into the at least one mailbox.

In another embodiment, an apparatus for using one or more processors to provide highly available storage groups in memory includes an update module for updating persistent information associated with a plurality of mappings between a plurality of mailboxes and a node with at least one mapping between at least one mailbox of the plurality of mailboxes and another node, wherein the node owns the plurality of mailboxes, an access module for mounting at least one mailbox stored within at least one storage group, a modification module for using the updated persistent information to modify the at least one mapping between the at least one mailbox and the node and a coupling module for migrating the at least one mailbox with another node.

In some embodiments, the modification module modifies at least one attribute associated with the at least one mailbox to map the at least one mailbox with the other node. In some embodiments, the modification module selects the other node as a target node for failing over a storage group of the at least one storage group based on a load-balancing policy. In some embodiments, the coupling module performs a rollback process on the at least one mailbox after a system failure at the other node. In some embodiments, the coupling module performs migrates at least one user back to the node from the other node, wherein the at least one user is associated with the at least one mailbox.

In yet another embodiment, a computer-readable-storage medium comprising one or more processor-executable instructions that, when executed by at least one processor, causes the at least one processor to update persistent information associated with mappings between a node and at least one mailbox of a plurality of mailboxes, wherein the node owns the plurality of mailboxes and the persistent information identifies another node as a failover target for the at least one mailbox of the plurality of nodes, access at least one mailbox stored within at least one storage group, wherein a node owns the at least one mailbox, modify at least one mapping between the at least one mailbox and the node and migrate the at least one mailbox to the other node.

In some embodiments, the computer-readable-storage medium further includes one or more processor-executable instructions that, when executed by the at least one processor, causes the at least one processor to modify at least one attribute associated with the at least one mailbox to bind the at least one mailbox with the other node. In some embodiments, the computer-readable-storage medium further includes one or more processor-executable instructions that, when executed by the at least one processor, causes the at least one processor to perform the migration the at least one mailbox in response to a failover of the at least one storage group from the node to the other node.

In some embodiments, the computer-readable-storage medium further includes one or more processor-executable instructions that, when executed by the at least one processor, causes the at least one processor to perform a rollback process on the at least one mailbox after a failure at the node. In some embodiments, the computer-readable-storage medium further includes one or more processor-executable instructions that, when executed by the at least one processor, causes the at least one processor to migrate at least one user back to the node from the other node, wherein the at least one user is associated with the at least one mailbox.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present disclosure provide highly available storage groups to a computer configuration (e.g., an n-node computer cluster) by manipulating mappings between one or more storage groups and one or more nodes. By updating persistent information associated with such mappings prior to a storage group failover, information that identifies a target node is preserved in the event of a system failure during mailbox migration. In some embodiments, a modification module modifies these mappings using the updated persistent information and then, instructs a coupling module to migrate one or more mailboxes (e.g., mailbox database files) from a node (e.g., an email server, such as a MICROSOFT Exchange Server) to the target node (e.g., another email server). Such a migration may occur in response to a system failure that affects the node as described further below. As a result, one or more computer users associated with the one or more mailboxes communicate and/or access emails through the other node instead of the node.

Figure 1:
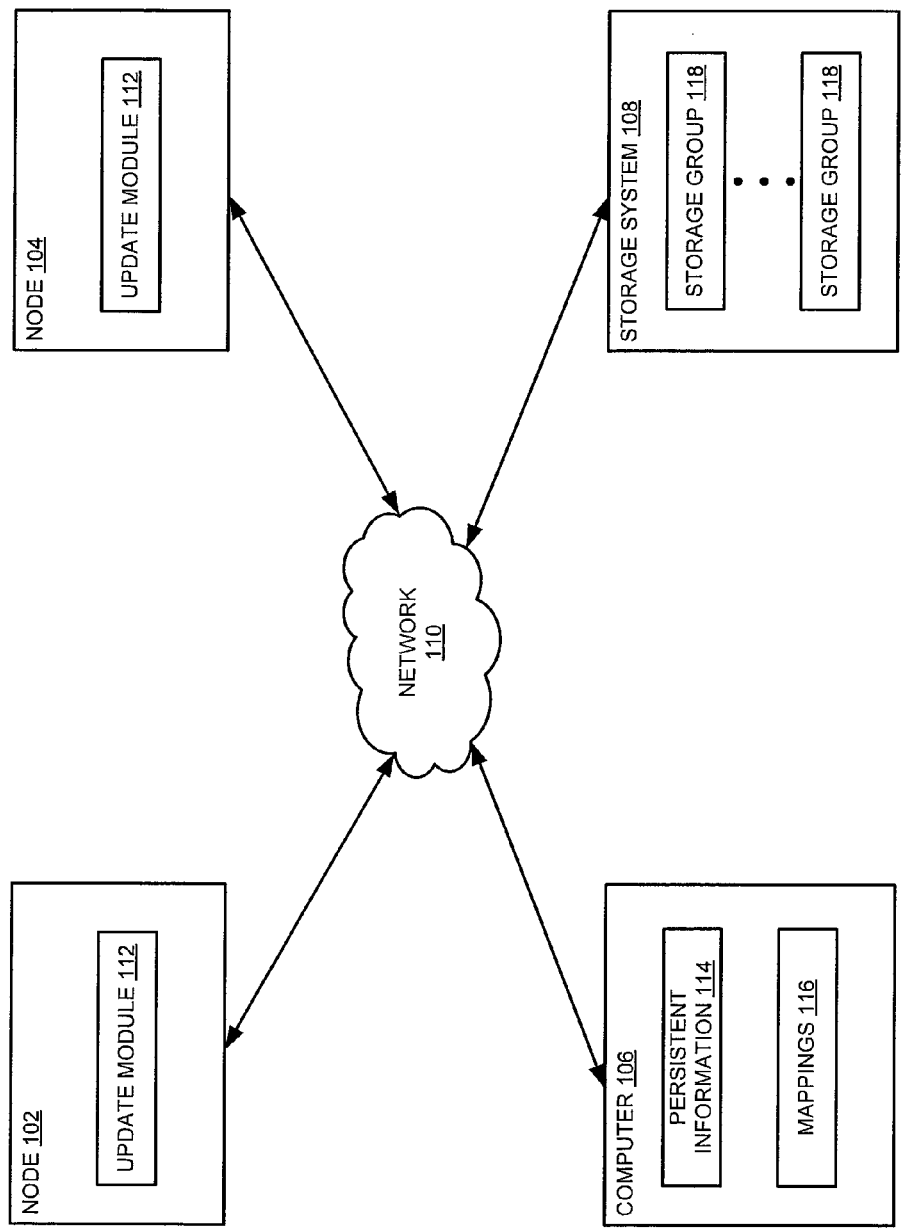
FIG. 1 is a block diagram of a system for providing highly available storage groups according to some embodiments.

FIG. 1 is a block diagram of a system 100 for providing highly available storage groups according to some embodiments. In some embodiments, the system 100 includes a node 102, a node 104, a computer 106 and a storage system 108 where each is coupled to each other through a network 110. It is appreciated that the system 100 may further include one or more additional nodes forming a datacenter.

In some embodiments, the node 102 and the node 104 may be types of computing devices (e.g., a laptop, a desktop, a terminal and/or the like) known to one of ordinary skill in the art having the benefit of this disclosure. In some embodiments, the node 102 and the node 104 may be servers that provide various application and/or data services to one or more user computers. For example, the node 102 and the node 104 may include one or more email servers (e.g., MICROSOFT Exchange Servers) that host mailbox associated with one or more computer users. The node 102 and/or the node 104 may further include various software packages, such as an update module 112 as described in further detal below.

The computer 106 may be a type of computing device (e.g., a laptop, a desktop, a terminal and/or the like) known to one of ordinary skill in the art having the benefit of this disclosure. The computer 106 may also be a physical machine or a virtual machine instance. In some embodiments, the computer 106 may facilitate various system administration tasks for one or more nodes in the system 100, such as the node 102 and/or the node 104. In some embodiments, the computer 106 includes persistent information 114 associated with mappings 116 between a plurality of mailboxes and the node 102 and/or the node 104 as explained in further detail below.

The storage system 108 generally includes various components (i.e., hardware and software) that are configured to manage various storage resources within a computing environment. The storage system 108 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for the node 102 and/or the node 104. In some embodiments, the storage system 108 facilitates persistent storage of one or more storage groups 118.

The network 110 comprises a communication system that connects computers by wire, cable, fiber optic and/or wireless link facilitated by various types of well-known network elements, such as hubs, switches, routers, and the like. The network 110 may employ various well-known protocols to communicate information amongst the network resources. For example, the network 110 may be a part of the Internet or Intranet using various communications infrastructure such as Ethernet, WiFi, WiMax, General Packet Radio Service (GPRS), and the like. The network 110 may also form a portion of a Storage Area Network (SAN) comprising Fibre channel switches and/or ISCI block storage devices.

In some embodiments, the highly available storage groups 118 may be provided as a service to one or more mail servers. For example, the mail servers may include software applications that operate within one or more running virtual machines. These virtual machines may remotely access the highly available storage groups 118 and present the mailboxes as locally stored.

Figure 2:
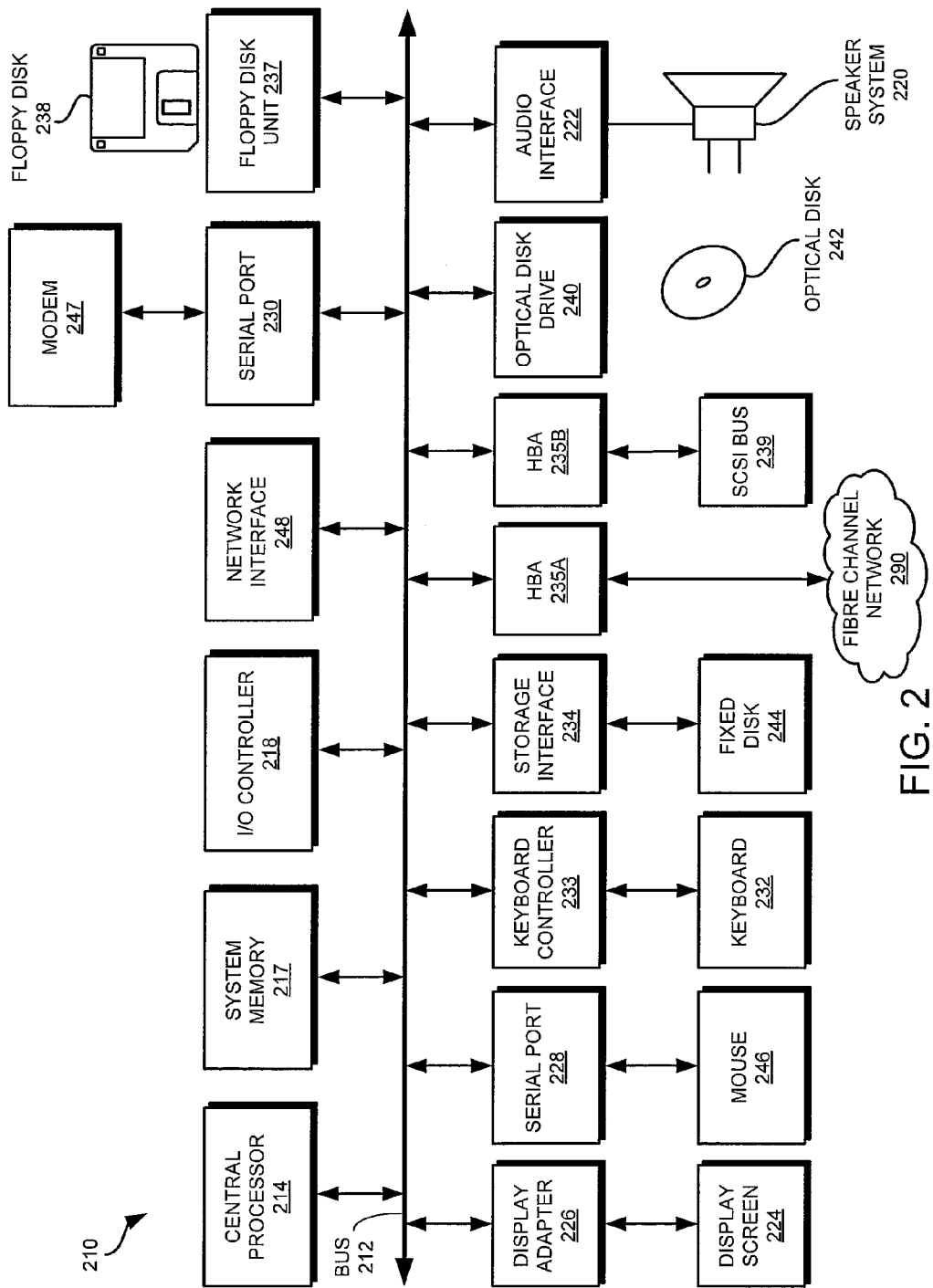
FIG. 2 is a block diagram of a computer system suitable for implementing the present disclosure.

FIG. 2 is a block diagram of a computer system 210 suitable for implementing the present disclosure. This system 210 is representative of a computer system that can be used to implement the node 102, the node 104 and/or the computer 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
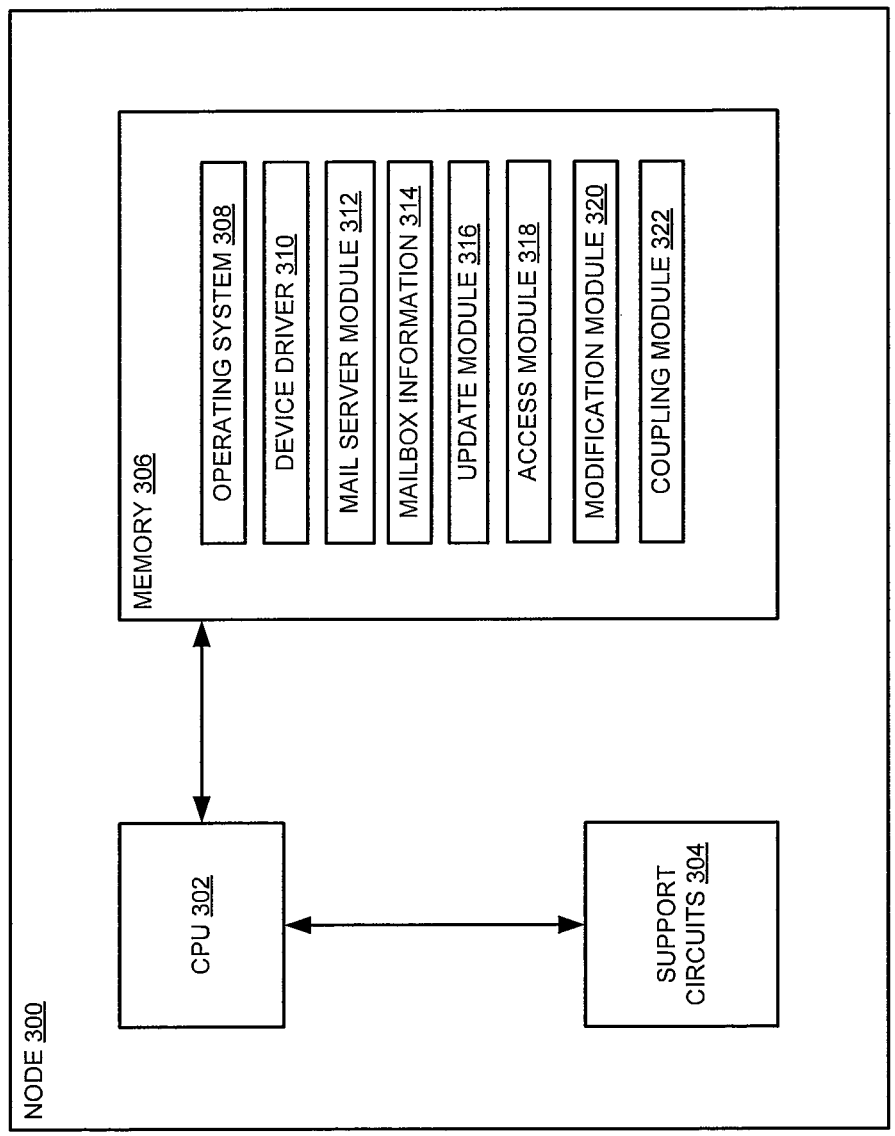
FIG. 3 is a block diagram of a node for providing highly available storage groups according to some embodiments.

FIG. 3 is a block diagram of a node 300 for accessing highly available storage groups according to various embodiments. The node 300 is a type of computing device (e.g., a laptop, a desktop and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 303 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308 and device drivers 310 as well as various software packages and data, such as an email server module 312, mailbox information 314, an update module 316, an access module 318, a modification module 320 and a coupling module 322.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

The email server module 312 may include software code (e.g., processor executable instructions) for installing and running an email management system (e.g., MICROSOFT Exchange Server) that facilitates access to one or more storage groups as explained in the present disclosure. In some embodiments, the email server module 312 may cooperate with various software modules (e.g., clustering software modules) to provide email application services (e.g., service groups) to the computer users. For example, the email server module 312 may cooperate with an access module (e.g., the access module 318 of FIG. 3) to mount and/or dismount mailbox database files and access the mailbox information 313. Furthermore, the email server module 312 may cooperate with the access module to offline and online various storage services that support the email application services.

In some embodiments, the email server module 312 is stored in the memory 306 and executed by the CPU 302 in order to retrieve and store the mailbox information 313 for one or more computer users. In some embodiments, these computer users communicate requests for various portions of the mailbox information 314 to the email server module 312. The mailbox information 313 may include sent emails, received emails, drafts, calendar details, contact information and/or the like. For example, the email server module 312 mounts a particular mailbox (e.g., one or more mailbox data files) and stores and/or retrieves outgoing and/or incoming emails associated with a particular computer user.

In some embodiments, the update module 316 (e.g., the update module 112 of FIG. 1) includes software code (e.g., processor executable instructions) that is stored in the memory 306 and executed by the CPU 302. The update module 316 may be an agent associated with computer clustering software (e.g., VERITAS Virtual Cluster Server One) that communicates information that indicates a failover target (e.g., a host name, an online system name and/or the like) for a storage group failover process. In some embodiments, the update module 316 may be configured to update persistent information (e.g., the persistent information 114 of FIG. 1) with such information prior to a migration of one or more mailboxes. If a system failure occurs, the one or more mailbox migrations may be rolled back and restarted until completion according to some embodiments.

The access module 318 may include software code (e.g., processor executable instructions) that is stored in the memory 306 and executed by the CPU 302 in order to access one or more mailboxes (e.g., mailbox database related files, such as .PST files, .EDB files, .STM files and/or the like) according to some embodiments. The mailboxes may include received and sent emails, public folders, journals as well as additional information associated with one or more computer users (e.g., calendars, meeting schedules, notes and/or the like). In some embodiments, the access module 318 cooperates with managed email server applications on a node to mount and/or dismount mailbox database files and transactional log files in order to access mailbox information as described further below.

In some embodiments, the modification module 320 may include software code (e.g., processor executable instructions) that is stored in the memory 406 and executed by the CPU 302 for modifying the mapping information. The modification module 320 may adjust various mappings (e.g., MICROSOFT ActiveDirectory attributes) between the mailboxes and the nodes (e.g., MICROSOFT Exchange Servers). In some embodiments, the modification module 320 modifies a mapping such that a particular mailbox, which was previously bound to a certain node (e.g., the node 102 of FIG. 1), is now mapped to another node (e.g., the node 104 of FIG. 1). For example, the modification module 320 may change an owner hostname attribute for the particular mailbox from a hostname associated with the certain node to a hostname associated with the other node.

In some embodiments, the certain node may own one or more storage groups and perform various services on one or more mailboxes within these storage groups. One or more computer users associated with these mailboxes may communicate mailbox information commands to the certain node, which mounts the mailboxes and perform these commands. For example, the certain node may perform various file system operations (e.g., read data, write data, delete data, create file and/or the like) on the mailboxes (e.g., one or more mailbox database files).

In some embodiments, the modification module 320 may select a target node for failing over a storage group of the one or more storage groups. When the certain node is overloaded with mailbox information requests, the modification module 320 may examine information associated with one or more remaining nodes within an n-node computer cluster to identify the suitable target node. For example, the modification module 320 may utilize a load-balancing policy to select the target node for failing over the storage group from the certain node.

In some embodiments, the coupling module 322 includes software code (e.g., processor executable instructions) that may be stored in the memory 306 and executed by the CPU 302 in order to couple a particular mailbox and/or storage group with the node 300. In some embodiments, the node 300 may be identified as a target email server and the coupling module 322 may instruct the access module 319 to mount the particular mailbox during a failover process. An administrator computer (e.g., the computer 106 of FIG. 1) may initiate the failover process after a failure at an email server (e.g., the node 102 of FIG. 1). Then, the coupling module 322 migrates one or more associated computer users from a failed email server to the target email server. Subsequently, the node 300 may provide email services to these computer users.

During a mailbox migration to the other node, a system failure may occur that may cause a particular mailbox and/or the persistent information (e.g., a persistent copy of the mappings 116 of FIG. 1) to be in an inconsistent state. In one embodiment, the mailbox migration may have started but the particular mailbox was never completely brought online at the other node. The persistent information may not identify the other node correctly or identify an incorrect node. For example, the persistent information may include an incorrect identifier (e.g., an online system name) for the other node. In response, the coupling module 322 may perform a rollback process, which revert the particular mailbox and/or the persistent information to a state prior to the system failure. One or more associated computer users are migrated back to the certain node from the target node. Otherwise, the particular mailbox and/or the persistent information remain point-in-time inconsistent.

During the rollback process, any changes caused by the execution of one or more file system operations are undone. The particular mailbox and/or the persistent information are now point-in-time consistent as a result. Once the migration from the other node to the certain node completes, the update module 316 updates the persistent information to indicate the other node to be the target node. Then, the modification module 320 executes an online operation and may instruct the coupling module 322 to migrate the associated computer users and mounts the particular mailbox onto an n-node cluster at the other node according to one embodiment. The update module 316 further updates the persistent information to identify the other node as the new owning node as well.

Alternatively, the rollback process may not be required after the system failure during the mailbox migration according to one or more embodiments. If the persistent information identifies the certain node as the owning server as well as the target node, the update module 316 updates the persistent information to indicate that the other node is the target node. The coupling module 322 completes the migration of the associated computer users and the access module 318 mounts the particular mailbox such that the associated computer user may communicate mailbox information requests. Then, the update module 316 updates the persistent information to indicate that the other node is the owning node.

If, on the other hand, the persistent information specifies the other node to be the target node, then the rollback process may not be required. For example, the mailbox migration may have completed, but the system failure may have halted the online operation of the particular mailbox. The access module 318 mounts the particular mailbox and the coupling module 322 completes the migration of the associated computer users to the other node. Then, the update module 316 updates the persistent information to indicate that the other node is the owning node. If the other node is no longer available, the modification module 320 selects a replacement node using a load-balancing policy according to one or more embodiments.

Optionally, a disaster recovery site (e.g., an n-node computer cluster at a remote location) may be maintained to mitigate any effects associated with a system failure. One or more disaster recovery nodes, for example, may create snapshots (e.g., point-in-time copies of volumes) of one or more mailboxes (e.g., mailbox files) and store copies of one or more mappings between the one or more mailboxes and a particular email server, such as the node 300. The disaster recovery nodes may also store a copy of the persistent information. In some embodiments, the update module 316 and the modification module 320 replicates updates to the persistent information and modifications to the mappings, respectively, to the disaster recovery nodes.

In some embodiments, the modification module 320 may initiate a process (e.g., a firedrill process) to ensure that the disaster recovery nodes are ready to assume roles as email servers in the event of a disaster recovery failover. In some embodiments, the modification module 320 modifies the mappings on a certain disaster recovery node in a same manner as the mappings at a primary site (e.g., the computer 106 of FIG. 1). Then, the modification module 320 instructs the access module 318 to mount a snapshot associated with a particular mailbox in order to bring the particular mailbox online at the certain disaster recovery node. If the access module 318 successfully mounts the snapshot, the certain disaster recovery node is ready to be a failover target. If, on the other hand, the access module 318 cannot successfully mount the snapshot, the certain disaster recovery node may not be ready.

Figure 4:
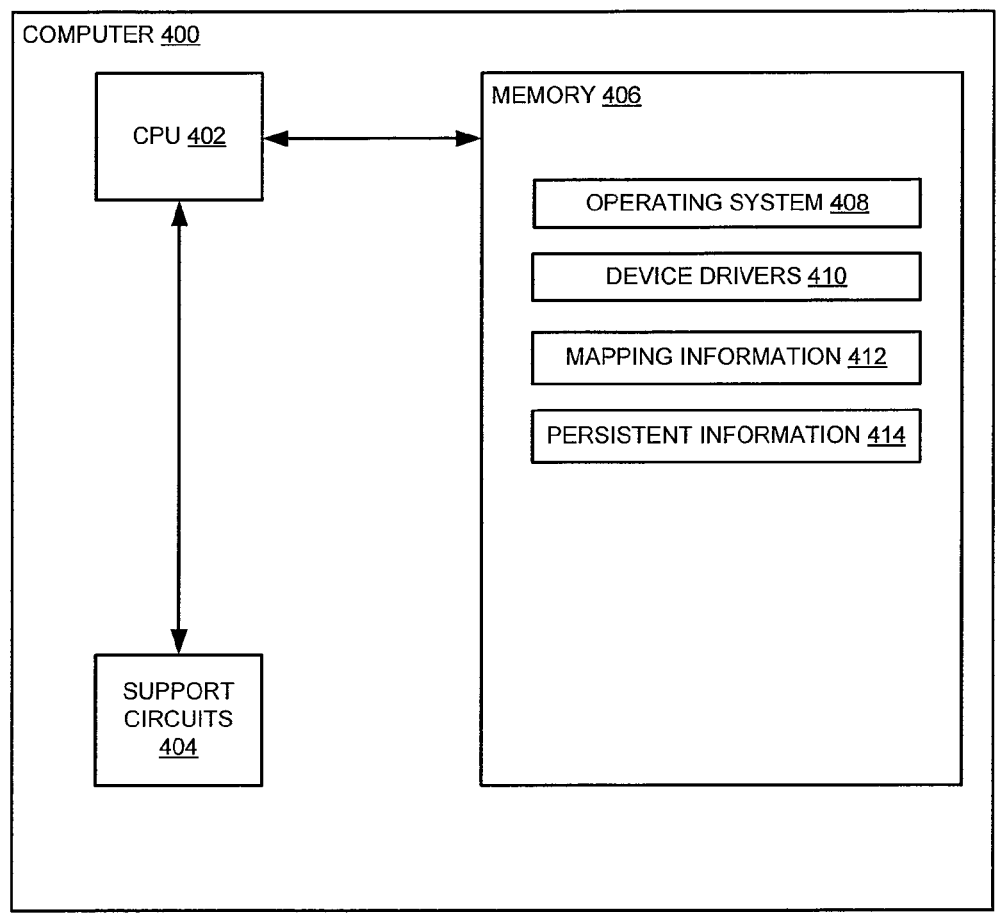
FIG. 4 is a block diagram of a computer for managing highly available storage groups according to some embodiments.

FIG. 4 is a block diagram of a computer 400 for managing highly available storage groups according to various embodiments. The computer 400 is a type of computing device (e.g., a laptop, a desktop and/or the like) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a read only memory, random access memory, disk drive storage, optical storage, removable storage, and the like. The memory 406 includes an operating system 408 and device drivers 410 as well as various software packages and data, such as mapping information 412 and persistent information 414.

The operating system 408 generally manages various computer resources (e.g., network resources, data storage resources, file system resources and/or the like). The operating system 408 is configured to execute operations on one or more hardware and/or software devices, such as Network Interface Cards (NICs), hard disks, virtualization layers, firewalls and/or the like. For example, the various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions associated with the device drivers 410 to execute various file system and/or storage operations. As an example, the operating system 408 may utilize a device driver associated with a NIC card to communicate data to another computer as explained further below.

In some embodiments, the mapping information 412 (e.g., the mapping information 114 of FIG. 1) may include one or more mappings between one or more storage groups and one or more nodes. As mentioned in the present disclosure, the nodes may form a computer cluster or datacenter in which the computer 400 (e.g., the computer 106 of FIG. 1) performs various administrative tasks (e.g., incremental backups, disaster recovery, archival, failover operations and/or the like) according to one or more embodiments. Each storage group may include mailbox information (e.g., one or more mailboxes) associated with one or more computer users within the computer cluster.

Each mapping may indicate a particular mailbox and/or storage group that is accessed by a certain node and then, provided to an associated computer user. For example, the mapping may include a hostname associated with an email server (e.g., MICROSOFT Exchange Server) as well as an identifier for a bound storage group and/or mailbox. The mapping may further include indicate one or more computers users associated with the bound storage group and/or mailbox. As described below, the mapping information 412 may be modified in order to facilitate migration of the particular mailbox and/or storage group to another node according to one or more embodiments. In some embodiments, the mapping information 412 may include one or more data objects that store persistent information associated with the storage groups as well as an email server that owns the storage groups.

In some embodiments, the persistent information 414 may include point-in-time consistent mappings between one or more mailboxes and one or more nodes. For example, the persistent information 414 may include data objects (e.g., clustering software data objects) that represent a portion of the mailbox information 412 at a particular point-in-time. For each mailbox of the one or more mailboxes, the persistent information 414 may identify an owning node (e.g., an owning email server) as well as a target node for an upcoming storage group failover process. If a particular mailbox is to be migrated from a node to another node, the persistent information 414 is updated prior to the storage group failover process. At this moment, the mailbox information 412 does not indicate the other node to be a failover target. If a problem or system failure occurs during the storage group failover process, then the persistent information 414 may be used to complete the mailbox migration. In some embodiments, the mapping information 412 may be modified to indicate that the other node is the owning node.

During a storage group failover process, an update module (e.g., the update module 316 of FIG. 3) may be configured to update the persistent information 414 with information associated with a failover target (e.g., a host name, an online system name and/or the like) prior to a migration of one or more mailboxes according to some embodiments. If a system failure occurs, one or more mailbox migrations may be rolled back and restarted until completion according to some embodiments.

An email server (e.g., the node 300 of FIG. 3), alternatively, may initiate the failover process to effectuate a load-balancing policy. For example, the email server may instruct a modification module (e.g., the modification module 320 of FIG. 3) to failover a single storage group from an email server to another email server due to slow response times associated with the email server. The modification module may determine that the other email server is underutilized and available to handle a load associated with the single storage group. The email server continues to provide access to one or more remaining storage groups.

Figure 5:
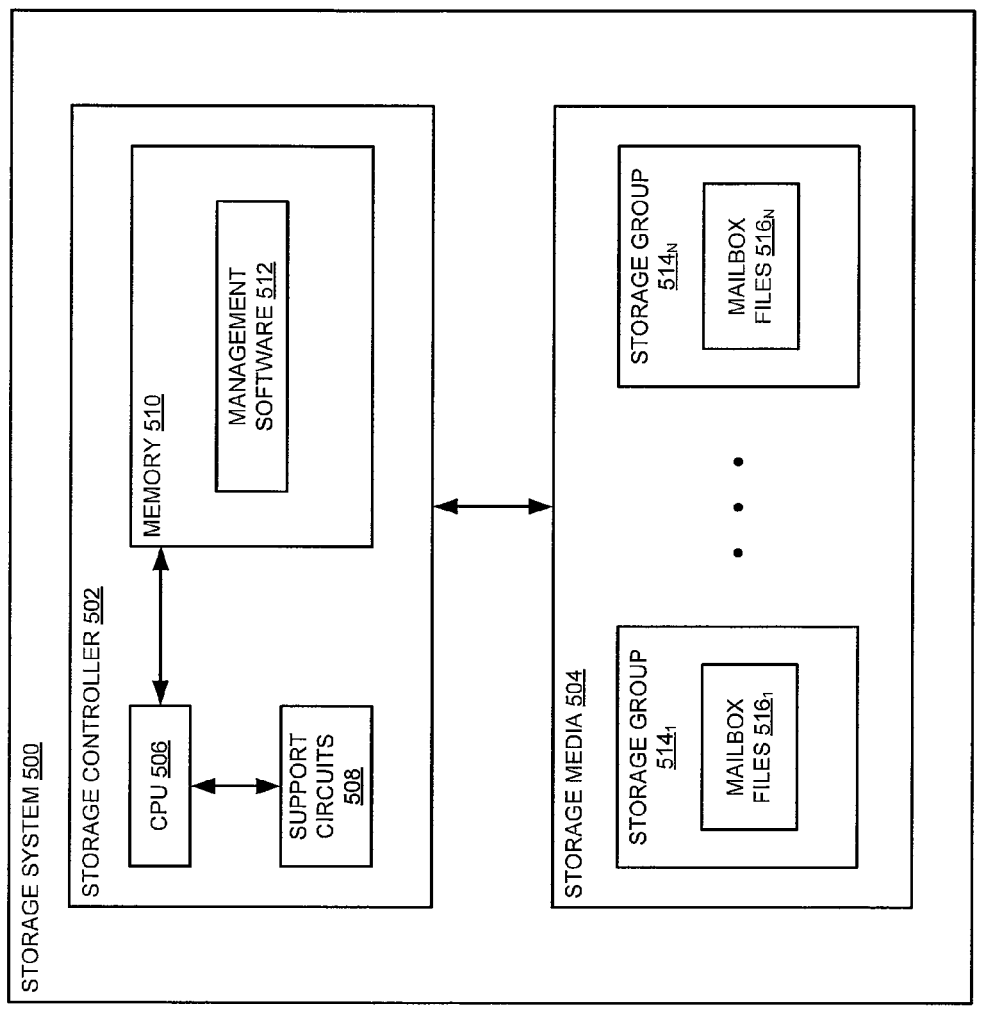
FIG. 5 is a block diagram of a storage system for providing highly available storage groups according to some embodiments.

FIG. 5 is a block diagram of a storage system 500 for providing highly available storage groups according to some embodiments. The storage system 500 generally includes various components (i.e., hardware and software) that are configured to manage storage resources, such as a storage controller 502 and storage media 504. The storage media 504 may include one or more data storage devices (e.g., hard disk drives, optical drives, magnetic tape drives and/or the like). The storage controller 502 may include a CPU 506, various support circuits 508 and memory 510. The memory 510 includes storage management software 512 that provides an interface (e.g., Integrated Drive Electronics/AT Attachment (IDE/ATA), Small Computer Systems Interface (SCSI) and/or the like) to the one or more data storage devices for one or more computing devices, such as email servers (e.g., the node 102 and/or the node 104 of FIG. 1).

The storage system 500 maintains critical mailbox information associated with one or more computer users. In some embodiments, the storage media 504 includes one or more storage groups 514. Each storage group 514 may include one or more storage units (e.g., LUNs). One or more mailbox files 516 (e.g., database files, transactional log files and/or the like) may form a portion of the particular storage group 514 that is owned by an active node (e.g., the node 102 of FIG. 1). As explained in the present disclosure, the particular storage group 514 may be migrated to another active node (e.g., the node 104 of FIG. 1) by modifying one or more mappings. After the migration of one or more computer users from the previously active node, a modification module (e.g., the modification module 320 of FIG. 3) brings online, at the other node, various storage services associated with the particular storage group 514 (e.g., during a failover process). In addition, an email server application (e.g., the mail server module 312 of FIG. 3) accesses the modified mappings and migrates one or more computer users from the previously active node.

Figure 6:
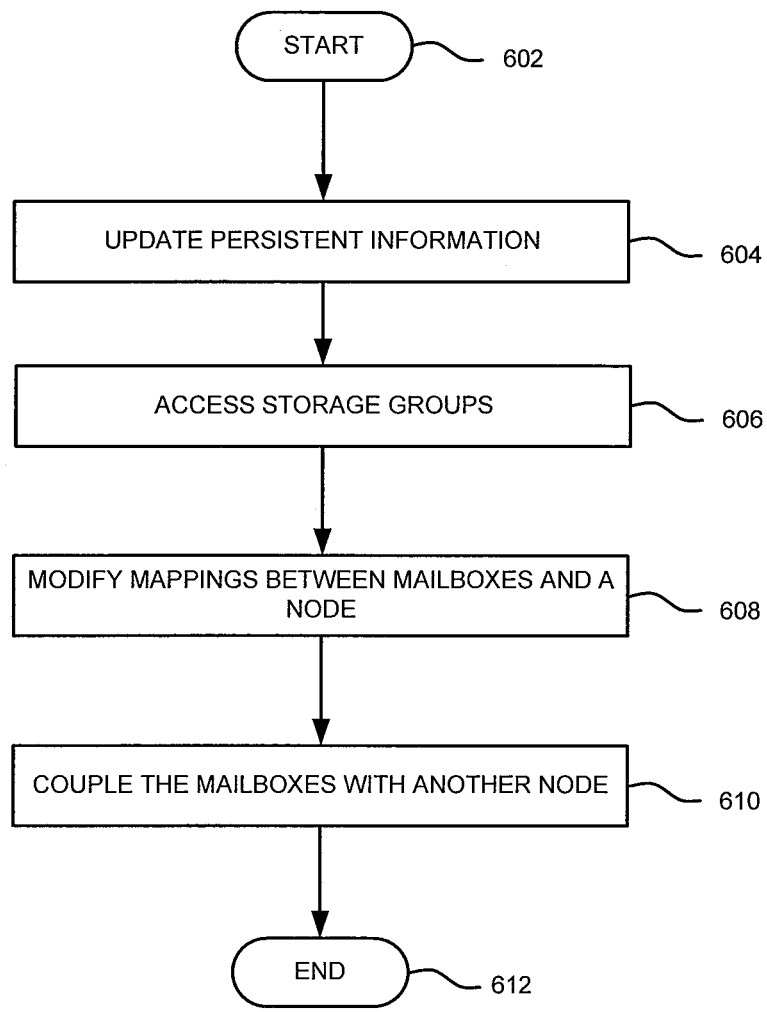
FIG. 6 is a flow diagram of a method for performing a failover process to provide highly available storage groups according to some embodiments.

FIG. 6 is a flow diagram of a method 600 for performing a failover process to provide highly available storage groups according to some embodiments. The method 600 starts at step 602 and proceeds to step 604. At step 604, persistent information (e.g., the persistent information 114 of FIG. 1 and/or the persistent information 414 of FIG. 4) associated with mappings (e.g., the mappings 116 of FIG. 1 and/or the mapping information 412 of FIG. 4) between a plurality of mailboxes and a node is updated. In some embodiments, an update module (e.g., the update module 316 of FIG. 3) performs one or more updates to the persistent information during the failover process. Each update occurs prior to a particular mailbox migration such that information associated with a failover target is maintained even if a system failure occurs during the failover process.

At step 606, one or more storage groups are accessed. The one or more storage groups may include one or more mailboxes to which one or more nodes (e.g., MICROSOFT Exchange Servers) bear ownership as described further below. In some embodiments, an access module (e.g., the access module 318 of FIG. 3) performs one or more mounting operations on the one or more mailboxes (e.g., mailbox database files and transactional log files).

At step 608, the mappings between the one or more mailboxes and a particular node are modified. In some embodiments, the particular node may be overloaded with incoming and outgoing email processing on behalf of one or more computer users associated with the one or more mailboxes. In some embodiments, a system failure may occur that renders the particular node non-operational. For example, network problems may cause slow response times for mailbox information requests from the computer users. Accordingly, one or more mappings between the one or more mailboxes and the particular node are modified such that another node owns the one or more mailboxes. In some embodiments, a modification module (e.g., the modification module 320 of FIG. 3) modifies these mappings in order to bind the one or more mailboxes to the other node as described in the present disclosure.

At step 610, the one or more mailboxes are coupled to the other node. Once the one or more mappings are modified, a coupling module (e.g., the coupling module 322 of FIG. 3) migrates the one or more mailboxes to the other node. In some embodiments, the coupling module also adjusts one or more attributes (e.g., ActiveDirectory attributes) in order to migrate the computer users associated with the one or more mailboxes to the other node as described in the present disclosure. In some embodiments, the coupling module instructs various software modules (e.g., clustering software, such as VERITAS Cluster Server One, mail server software, such as MICROSOFT Exchange Server, and/or the like) running within the other node to mount the one or more mailboxes and operate certain services (e.g., application services, storage services, network services and/or the like) that support mailbox information processing. The other node, as a result, provides various email services to the one or more computer users, such as storing incoming emails, communicating outgoing emails, processing mailbox information requests and/or the like. At step 612, the method 600 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method comprising:
 updating, using one or more processors, a persistent information as an updated persistent information, wherein
  the persistent information identifies a first mapping,
  the first mapping maps a node to a first mailbox of a plurality of mailboxes,
  the plurality of mailboxes are stored using a first storage,
  the node is configured to provide email services to the plurality of mailboxes, and
  the updating updates the persistent information such that the updated persistent information identifies an other node as a failover target for the first mailbox;
 coupling the first mailbox with the other node, wherein
  the coupling is based on the updated persistent information,
  after the coupling, the other node is configured to provide the email services to the first mailbox, and
  after the coupling, the plurality of mailboxes are stored using the first storage; and
 modifying the first mapping as a modified first mapping, wherein the modified first mapping maps the first mailbox to the other node,
the modifying the first mapping is based on the failover target identified in the updated persistent information, and
the modifying the first mapping is performed in response to performing the coupling the first mailbox with the other node.

2. The method of claim 1, wherein
the first mapping indicates a point-in-time consistent mapping of the node with the first mailbox, and
the updated first mapping indicates other point-in-time consistent mapping of the other node with the first mailbox.

3. The method of claim 1, wherein
the coupling the first mailbox comprises
migrating at least one user to the other node, and
the at least one user is associated with the first mailbox.

4. The method of claim 1, further comprising
replicating at least the modified first mapping at a disaster recovery node as a replicated modified first mapping, and
creating a snapshot of the first mailbox, wherein
the disaster recovery node is configured to use at least the replicated first mapping and the snapshot.

5. The method of claim 1, wherein
modifying the first mapping comprises
modifying at least one attribute associated with the first mailbox to perform the mapping of the first mailbox to the other node.

6. The method of claim 1, wherein
the updated persistent information further indentifies the other node as a target node for failing over the first storage.

7. The method of claim 1, wherein
the updated persistent information further indentifies the other node as a target node for failing over the first storage from the node to the other node based on a load-balancing policy.

8. The method of claim 1, further comprising
performing a rollback process on the first mailbox in response to a failure at the other node, wherein
the performing of the rollback process occurs prior to the modifying of the first mapping, and
the performing of the rollback process uses the first mapping and the updated persistent information.

9. The method of claim 8, wherein coupling the first mailbox to the other node comprises
migrating at least one user back to the node from the other node, wherein the at least one user is associated with the first mailbox.

10. The method of claim 1, further comprising
transforming the persistent information and at least one mailbox file into the first mailbox.

11. An apparatus comprising:
a processor;
an update module, executable by the processor, for updating a persistent information as updated persistent information, wherein
the persistent information comprises a copy of a first mapping,
the first mapping maps a first mailbox to a node,
the plurality of mailboxes are stored using a first storage group,
the node is configured to provide email services to the plurality of mailboxes, and
the update module updates the persistent information such that the updated persistent information identifies an another node as a failover target for the first mailbox;
a coupling module for migrating the first mailbox to the another node, wherein
the migration is based on the updated persistent information,
after the coupling module performs the migration, the other node is configured to provide the email services to the first mailbox, and
after the coupling module performs the migration, the plurality of mailboxes are stored using the first storage group; and
a modification module for modifying the first mapping as a modified first mapping,
wherein
the modified first mapping maps the first mailbox to the other node,
the modification module modifies the first mapping based on the failover target identified in the updated persistent information, and
the modification module modifies the first mapping in response to the migration of the first mailbox to the another node.

12. The apparatus of claim 11, further comprising
an access module for mounting the first mailbox stored using the first storage group modification.

13. The apparatus of claim 11, wherein
the modification module selects the other node as a target node for failing over the first storage group based on a load-balancing policy.

14. The apparatus of claim 11, wherein
the coupling module performs a rollback process on the at least one mailbox in response to a system failure at the other node,
the coupling module performs the rollback process prior to the modification module modifying the first mapping, and
the coupling module performs the rollback process using the first mapping and the updated persistent information.

15. The apparatus of claim 14, wherein
the first mapping indicates a point-in-time consistent mapping of the node with the first mailbox, and
the updated first mapping indicates other point-in-time consistent mapping of the other node with the first mailbox.

16. A non-transitory computer-readable-storage medium comprising one or more processor-executable instructions that, when executed by at least one processor, causes the at least one processor to:
update persistent information as an updated persistent information, wherein
the persistent information identifies a first mapping,
first mapping maps a node to a first mailbox of a plurality of mailboxes,
the plurality of mailboxes are stored using a first storage, and
the node is configured to provide email services to the plurality of mailboxes, and
the updating updates the persistent information such that the updated persistent information identifies another node as a failover target for the first mailbox;
couple the first mailbox with the other node, wherein
the first mailbox is coupled based on the updated persistent information, after the coupling, the other node is configured to provide the email services to the first mailbox, and after the coupling, the plurality of mailboxes are stored using the first storage; and modify the first mapping as a modified first mapping, wherein the modified first mapping maps the first mailbox to the other node, the modification of the first mapping is performed based on the failover target identified in the updated persistent information, and the modification of the first mapping is performed in response to the coupling of the first mailbox and the other node.

17. The non-transitory computer-readable-storage medium of claim 16 further comprises one or more processor-executable instructions that, when executed by the at least one processor, causes the at least one processor to modify at least one attribute associated with the first mailbox to couple the first mailbox to the other node.

18. The non-transitory computer-readable-storage medium of claim 16 further comprises one or more processor-executable instructions that, when executed by the at least one processor, causes the at least one processor to perform the coupling of the first mailbox in response to a failover of the at first storage from the node to the other node.

19. The non-transitory computer-readable-storage medium of claim 16 further comprises one or more processor-executable instructions that, when executed by the at least one processor, causes the at least one processor to perform a rollback process on the first mailbox in response to a failure at the other node, wherein the performing of the rollback process occurs prior to the modifying of the first mapping, and the performing of the rollback process uses the first mapping and the updated persistent information.

20. The non-transitory computer-readable-storage medium of claim 19 further comprises one or more processor-executable instructions that, when executed by the at least one processor, causes the at least one processor to migrate at least one user back to the node from the other node, wherein the at least one user is associated with the first mailbox.

* * * * *